(12) United States Patent
Jeong et al.

(10) Patent No.: US 12,202,123 B2
(45) Date of Patent: Jan. 21, 2025

(54) CLEANING ROBOT

(71) Applicant: Samsung Electronics Co., Ltd., Suwon-si (KR)

(72) Inventors: Jaeyoon Jeong, Suwon-si (KR); Donghun Lee, Suwon-si (KR); Jinhee Kim, Suwon-si (KR); Minwoo Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 260 days.

(21) Appl. No.: 17/835,269

(22) Filed: Jun. 8, 2022

(65) Prior Publication Data

US 2023/0158682 A1 May 25, 2023

Related U.S. Application Data

(63) Continuation of application No. PCT/KR2022/007858, filed on Jun. 2, 2022.

(30) Foreign Application Priority Data

Nov. 19, 2021 (KR) .................. 10-2021-0160712

(51) Int. Cl.
*B25J 11/00* (2006.01)
*A47L 9/28* (2006.01)
*B25J 13/08* (2006.01)
*B25J 19/02* (2006.01)
*G01S 7/481* (2006.01)
(Continued)

(52) U.S. Cl.
CPC ......... *B25J 11/0085* (2013.01); *A47L 9/2805* (2013.01); *A47L 9/2857* (2013.01); *B25J 13/086* (2013.01); *B25J 19/021* (2013.01); *G01S 7/4816* (2013.01); *G01S 7/51* (2013.01); *G01S 17/89* (2013.01); *A47L 2201/04* (2013.01)

(58) Field of Classification Search
CPC .... B25J 11/0085; B25J 13/086; B25J 19/021; G01S 7/4816; G01S 7/51; G01S 17/89
See application file for complete search history.

(56) References Cited

U.S. PATENT DOCUMENTS 9,904,375 B1 * 2/2018 Donnelly ................ G05D 1/00
10,111,567 B2 10/2018 Son et al.
(Continued)

FOREIGN PATENT DOCUMENTS

JP 2021-101812 A2 7/2021
JP 2021-112417 A 8/2021
(Continued)

OTHER PUBLICATIONS

Wonil Chung; POV LED Display on Bicycle Wheel; https://www.youtube.com/watch?v=58xfEayH7WU; Dec. 10, 2014.
(Continued)

*Primary Examiner* — Kira Nguyen
(74) *Attorney, Agent, or Firm* — Jefferson IP Law, LLP

(57) ABSTRACT

A cleaning robot is provided. The cleaning robot includes a body, a light detection and ranging (LiDAR) module having a LiDAR sensor rotatably supported by the body, a light-emitting display module mounted on the LiDAR module, wherein the light-emitting display module is configured to display an image based on an afterimage effect according to a rotation of the LiDAR module.

19 Claims, 14 Drawing Sheets

(51) Int. Cl.
    *G01S 7/51*    (2006.01)
    *G01S 17/89*   (2020.01)

(56) References Cited

U.S. PATENT DOCUMENTS

| | | | |
|---|---|---|---|
| 2018/0050634 A1* | 2/2018 | White | B60Q 1/543 |
| 2018/0164439 A1* | 6/2018 | Droz | G01S 17/89 |
| 2018/0348783 A1* | 12/2018 | Pitzer | G06V 20/20 |
| 2020/0405440 A1 | 12/2020 | Shelton, IV et al. | |
| 2021/0199807 A1 | 7/2021 | Shin et al. | |
| 2022/0183525 A1* | 6/2022 | Sohn | A47L 9/2852 |
| 2022/0291351 A1* | 9/2022 | Yun | H02J 50/10 |
| 2023/0045270 A1 | 2/2023 | Ahn et al. | |
| 2023/0139369 A1 | 5/2023 | Park et al. | |

FOREIGN PATENT DOCUMENTS

| | | |
|---|---|---|
| JP | 2021-122395 A | 8/2021 |
| KR | 10-1832323 B1 | 2/2018 |
| KR | 10-2035018 B1 | 10/2019 |
| KR | 10-2155095 B1 | 9/2020 |
| KR | 10-2246952 B1 | 4/2021 |
| KR | 10-2021-0112257 A | 9/2021 |
| KR | 10-2595870 B1 | 10/2023 |

OTHER PUBLICATIONS

International Search Report dated Aug. 23, 2022, issued in an International Application No. PCT/KR2022/007858.

\* cited by examiner

CLEANING ROBOT

CROSS-REFERENCE TO RELATED APPLICATION(S)

This application is a continuation application, claiming priority under § 365(c), of an International application No. PCT/KR2022/007858, filed on Jun. 2, 2022, which is based on and claims the benefit of a Korean patent application number 10-2021-0160712, filed on Nov. 19, 2021, in the Korean Intellectual Property Office, the disclosure of which is incorporated by reference herein in its entirety.

TECHNICAL FIELD

The disclosure relates to a cleaning robot.

BACKGROUND ART

A cleaning robot is an electronic device that cleans a region in an indoor space by autonomously driving in the region and sucking in dust or foreign substances in the indoor space. In order for a cleaning robot to perform a set operation such as cleaning, a map showing the structure of or obstacles in an indoor space needs to be generated. As a method of generating a map of an indoor space, by a cleaning robot, a vision mapping method and a method of using a light detection and ranging (LiDAR) sensor are frequently used. In the vision mapping method, information about the structure of and obstacles in the indoor space is obtained by detecting obstacles by using a proximity sensor while traveling through the indoor space in a zigzag pattern or traveling in a certain region randomly. The method of using a LiDAR sensor involves optically scanning a 360-degree range with respect to a cleaning robot by rotating the LiDAR sensor and obtaining information about the structure of and obstacles in an indoor space by measuring distances to objects.

A cleaning robot includes an output device and an input device for providing a user interface. The output device may include, for example, a display module. The input device may include, for example, a button.

The above information is presented as background information only to assist with an understanding of the disclosure. No determination has been made, and no assertion is made, as to whether any of the above might be applicable as prior art with regard to the disclosure.

DISCLOSURE

Technical Problem

A LiDAR module including a LiDAR sensor is rotated about a body of a cleaning robot. Aspects of the disclosure are to address at least the above-mentioned problems and/or disadvantages and to provide at least the advantages described below. Accordingly, an aspect of the disclosure is to provide a cleaning robot in which a user interface is implemented using a rotating LiDAR module.

Another aspect of the disclosure is to provide a cleaning robot which may protect a rotating LiDAR module.

Additional aspects will be set forth in part in the description which follows and, in part, will be apparent from the description, or may be learned by practice of the presented embodiments.

Technical Solution

In accordance with an aspect of the disclosure, a cleaning robot is provided. The cleaning robot includes a body, a LiDAR module having a LiDAR sensor and rotatably supported by the body, and a light-emitting display module mounted on the LiDAR module, wherein the light-emitting display module is configured to display an image based on an afterimage effect according to a rotation of the LiDAR module.

According to an embodiment, the light-emitting display module may be mounted in an upper portion of the LiDAR module.

According to an embodiment, the cleaning robot may include a plurality of the light-emitting display modules. The plurality of light-emitting display modules may be arranged at equal angular intervals.

According to an embodiment, the LiDAR module may include an input unit for receiving an input.

According to an embodiment, the input unit may include a non-contact-type sensor.

According to an embodiment, the input unit may include a proximity sensor.

According to an embodiment, the input unit may include an upper proximity sensor arranged in an upper portion of the LiDAR module. The upper proximity sensor may be arranged at a rotational center of the LiDAR module. The upper proximity sensor may have an angular interval with respect to the light-emitting display module.

According to an embodiment, the input unit may include a side proximity sensor arranged in a side portion of the LiDAR module. The side proximity sensor may have an angular interval with respect to the LiDAR sensor. The side proximity sensor may be arranged closer to the upper portion of the LiDAR module than the LiDAR sensor.

In accordance with another aspect of the disclosure, a cleaning robot is provided. The cleaning robot includes a body, a LiDAR module having a LiDAR sensor and rotatably supported by the body, and a proximity sensor mounted in the LiDAR module.

According to an embodiment, the proximity sensor may include an upper proximity sensor arranged in an upper portion of the LiDAR module.

According to an embodiment, the proximity sensor may include a side proximity sensor arranged in a side portion of the LiDAR module.

According to an embodiment, the cleaning robot may include a light-emitting display module mounted on the LiDAR module, wherein the light-emitting display module is configured to display an image based on an afterimage effect according to a rotation of the LiDAR module.

Advantageous Effect

According to the embodiments of a cleaning robot, by mounting a light-emitting display module on a rotating LiDAR module, various types of information may be provided to a user.

According to the embodiments of the cleaning robot described above, a proximity sensor mounted in a rotating LiDAR module may be used as an input unit.

According to the embodiments of the cleaning robot described above, by arranging a proximity sensor in a rotating LiDAR module, a cleaning robot having a structure in which the LiDAR module may be protected may be implemented.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

Figure 1:
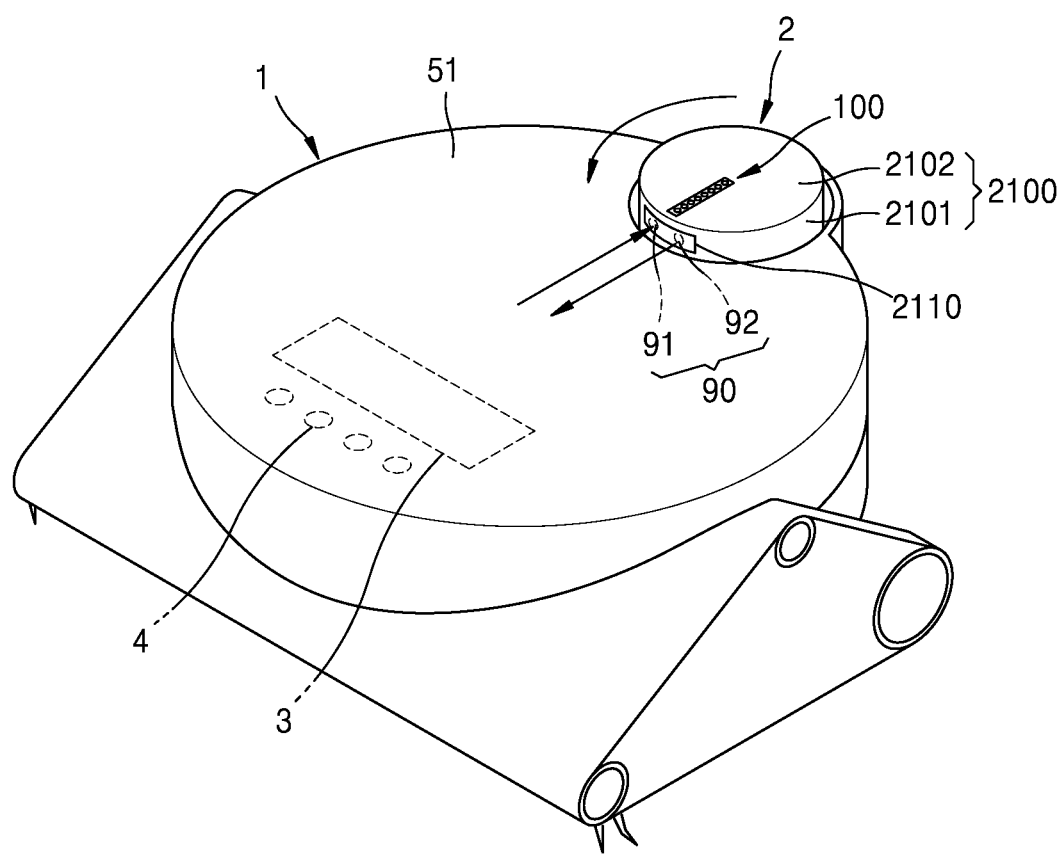
FIG. 1 is a schematic perspective view of a cleaning robot according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art, precedents, or new technology in the art will recognize that various changes and modifications of the various embodiments described herein can be made without departing from the scope and spirit of the disclosure. In addition, description of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

All terms used in the description including technical and scientific terms shall have the same meaning as generally understood by those skilled in the art.

It should be understood that, when a part "comprises" or "includes" an element in the specification, unless otherwise defined, other elements are not excluded from the part and the part may further include other elements. Also, in the specification, the term " . . . units" or " . . . modules" denote units or modules that process at least one function or operation, and may be realized by hardware, software, or a combination of hardware and software.

The expression "configured to" as used in this disclosure may be interchangeably used with, depending on the situation, for example, "suitable for", "having the capacity to", "designed to", "adapted to", "made to", or "capable of". The term "configured to ~" may not necessarily mean only "specifically designed to" in hardware. Instead, in some contexts, the expression "a system configured to ~" may mean that the system is "capable of ~" in combination with other devices or components. For example, the phrase "a processor configured to perform A, B, and C" may refer to a dedicated processor (e.g., an embedded processor) for performing the operations, or a generic-purpose processor (e.g., a central processing unit (CPU) or an application processor) capable of performing the operations by executing one or more software programs stored in a memory.

In addition, in the disclosure, when a component is referred to as "connected" or "coupled" with another component, the component may be directly connected to or directly coupled to the other component, or, unless there is another opposite description thereto, it will be understood that the component may be connected or coupled by means of another component.

Hereinafter, the disclosure will now be described more fully with reference to the accompanying drawings, in which embodiments of the disclosure are shown such that one of ordinary skill in the art may easily work the disclosure. The disclosure may, however, be embodied in many different forms and should not be construed as limited to the embodiments set forth herein. Hereinafter, embodiments of the disclosure are described in detail with reference to the drawings.

Figure 2:
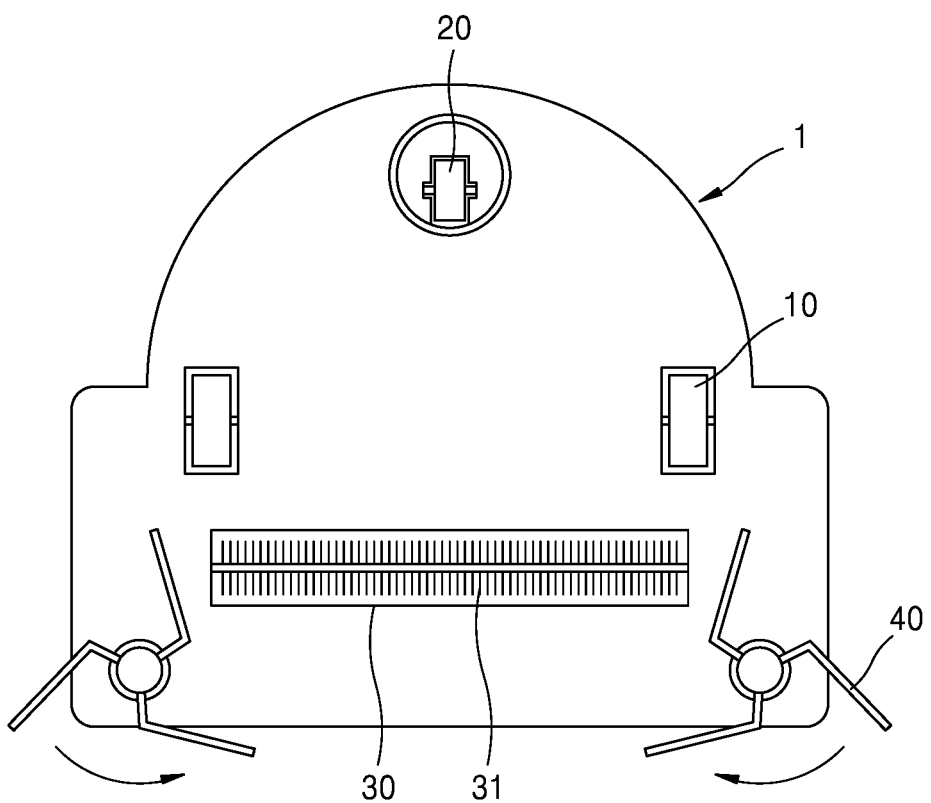
FIG. 2 is a schematic rear view of the cleaning robot illustrated in FIG. 1, according to an embodiment of the disclosure.

FIG. 1 is a schematic perspective view of a cleaning robot according to an embodiment of the disclosure. FIG. 2 is a schematic rear view of the cleaning robot illustrated in FIG. 1, according to an embodiment of the disclosure. A cleaning robot is a robot device that may move by itself using a driving motor and wheels, or the like, and may perform a cleaning operation while moving in an indoor space. The 'indoor space' may refer to an area in which the cleaning robot may substantially freely move. The indoor space may be, for example, a space inside a house or an office.

Referring to FIGS. 1 and 2, a cleaning robot according to an embodiment may include a body 1 and a LiDAR module 2. The cleaning robot may search an indoor space by using the LiDAR module 2 and generate a map of the indoor space.

A driving wheel 10 may be provided under the body 1. The driving wheel 10 may be provided in plurality. For example, two driving wheels 10 may be symmetrically arranged under the body 1. A caster 20 may be provided between the driving wheels 10. The caster 20 may be arranged in a forward direction or a backward direction with respect to the two driving wheels 10. The driving wheels 10 and the caster 20 are driven by a driving mechanism (not shown), and enable moving operations such as forward movement, backward movement, and rotation during a process of cleaning.

A suction inlet 30 is provided in a lower portion of the body 1. A suction device generating a suction force for sucking foreign substances such as dust thereinto through the suction inlet 30 may be provided inside the body 1. Foreign substances such as dust, which are sucked into the body 1 through the suction inlet 30, may be accommodated in a dust collector (not shown). A brush 31 is installed in the suction inlet 30 and rotated. The brush 31 sweeps foreign substances such as dust, which are piled up on the floor of an indoor space, and transports the same into the suction inlet 30. A side brush 40 is arranged at both sides of the suction inlet 30 and rotated to transport foreign substances on a floor surface toward the suction inlet 30. Although not illustrated in the drawings, a battery for supplying power to a plurality of driving motors for driving the driving wheels 10, the caster 20, the brush 31, the side brush 40, and the LiDAR module 2, and a charging terminal which is connected to a docking station to charge the battery may be provided in the body 1.

The LiDAR module 2 may include a LiDAR sensor 90. The LiDAR sensor 90 may include a light-transmitting portion 91 which irradiates light, for example, laser, to the outside, and a light-receiving portion 92 which receives reflected laser. The cleaning robot may search an indoor space by using the LiDAR sensor 90, and detect a structure of and obstacles in the indoor space to generate a map of the indoor space. The LiDAR sensor 90 may emit laser into the indoor space, and analyze a difference in time taken by laser to be reflected by an object or an obstacle in the indoor space and then return, and signal intensity, to thereby obtain information about a distance, position, direction, material, or the like of an object or an obstacle. The cleaning robot may search the indoor space by using the LiDAR sensor 90 to thereby obtain geometric information about the position and structure of walls, objects, or obstacles in the indoor space.

In order to obtain information about the indoor space around the body 1, at least a portion of the LiDAR module 2 protrudes from the body 1, for example, from an upper surface 51 of the body 1. The LiDAR module 2 may include a housing 2100 accommodating the LiDAR sensor 90. The housing 2100 may include a side portion 2101 and an upper portion 2102. The side portion 2101 may partially protrude from the upper surface 51 of the body 1. For example, the side portion 2101 may be cylindrical, and the upper portion 2102 may be circular. The upper portion 2102 is at a higher level than the upper surface 51 of the body 1. A light window 2110 is provided in the side portion 2101. The light window 2110 is provided at a higher level than the upper surface 51 of the body 1. The LiDAR sensor 90 irradiates laser to the outside through the light window 2110, and reflected laser is incident on the LiDAR sensor 90 through the light window 2110. In order to obtain information about an indoor space in a 360 degree-range with respect to the cleaning robot, the LiDAR module 2 is rotated about the body 1 by a driving motor (not shown). The LiDAR module 2 is rotatably supported by the body 1.

Referring to FIG. 1, the cleaning robot according to the embodiment may include a light-emitting display module 100 displaying an image by using the rotation of the LiDAR module 2. The light-emitting display module 100 is mounted on the LiDAR module 2, and may include a fan light emitting diode (LED) display which displays an image by an afterimage effect as the LiDAR module 2 is rotated. The light-emitting display module 100 is provided, for example, on the upper portion 2102 of the housing 2100 of the LiDAR module 2. In other words, the light-emitting display module 100 is arranged on the upper portion 2102 of the LiDAR module 2 to emit light upwards.

Figure 3:
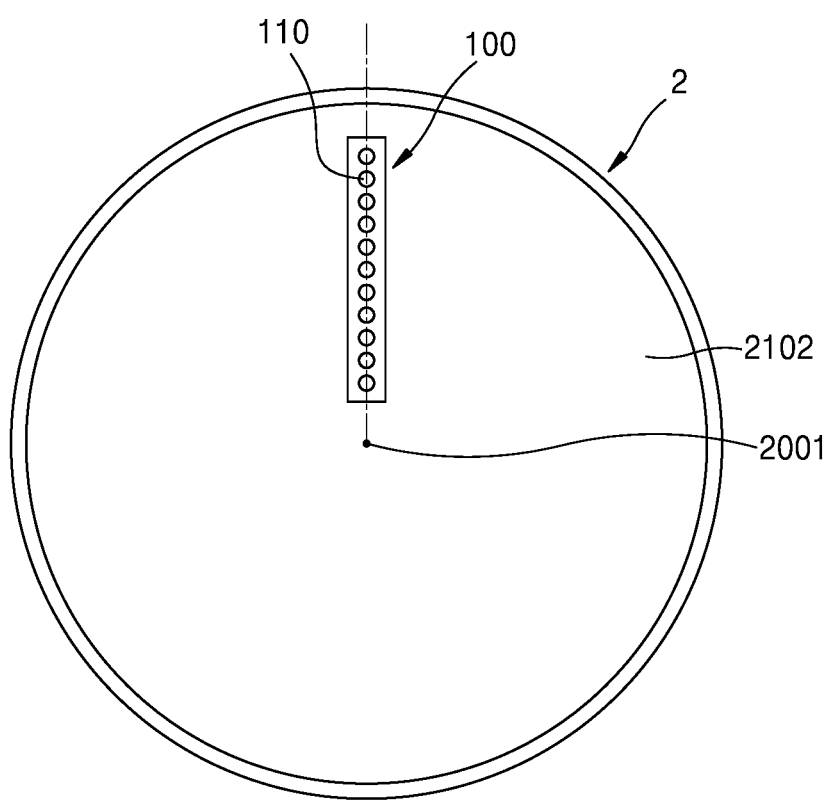
FIG. 3 is a plan view illustrating an embodiment of a light-emitting display module according to an embodiment of the disclosure.

FIG. 3 is a plan view illustrating an embodiment of the light-emitting display module 100 according to an embodiment of the disclosure.

Referring to FIG. 3, the light-emitting display module 100 may include a plurality of light-emitting elements 110. The plurality of light-emitting elements 110 may be, for example, light-emitting diodes. The plurality of light-emitting elements 110 may be arranged in a radial direction from a rotation center 2001 of the LiDAR module 2. FIG. 3 illustrates, as an example, a plurality of light-emitting elements 110 arranged in one column, but the disclosure is not limited thereby. The light-emitting display module 100 may include a plurality of light-emitting elements 110 in two or more columns. In FIG. 3, the plurality of light-emitting elements 110 arranged in a straight line in a radial direction are illustrated as an example. However, the plurality of light-emitting elements 110 may also be arranged in a curved shape. The plurality of light-emitting elements 110 may emit monochromatic light. The plurality of light-emitting elements 110 may include, for example, an R-light-emitting element, a G-light-emitting element, and a B-light-emitting element which emit light of red, green, and blue colors, respectively. Accordingly, a color image may be displayed.

While one light-emitting display module 100 is disclosed in FIG. 3, the scope of the disclosure is not limited thereby. The cleaning robot may include a plurality of light-emitting display modules 100.

Figure 4:
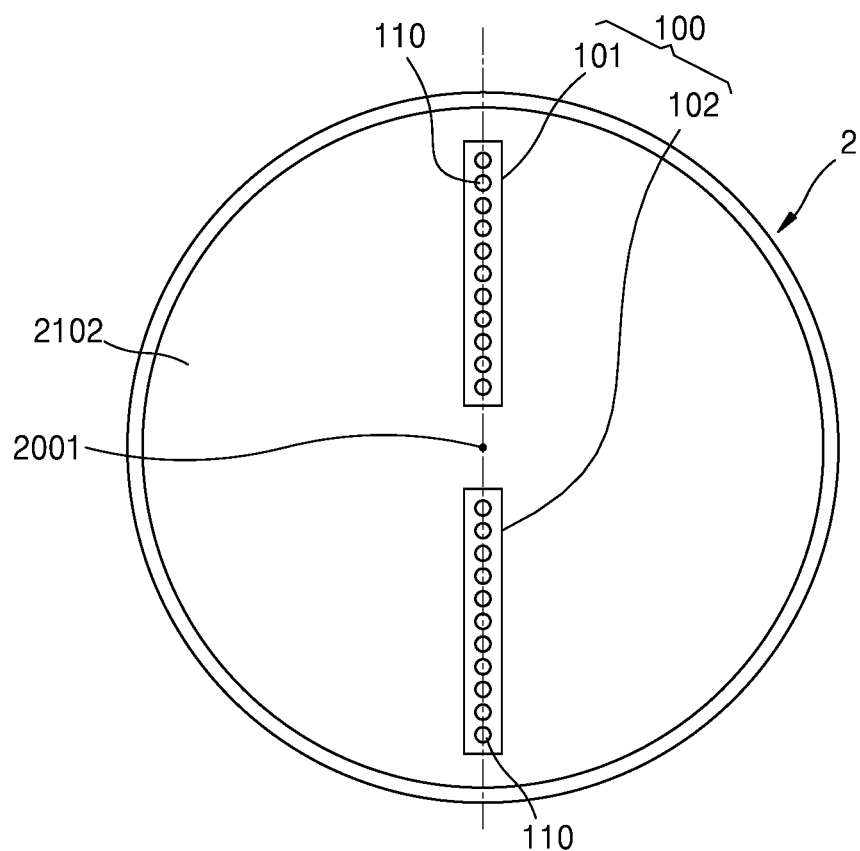
FIG. 4 is a plan view illustrating an embodiment of a light-emitting display module according to an embodiment of the disclosure.

FIG. 4 is a plan view illustrating an embodiment of the light-emitting display module 100 according to an embodiment of the disclosure.

Referring to FIG. 4, the light-emitting display module 100 may include two light-emitting display modules 101 and 102. The two light-emitting display modules 101 and 102 may be spaced apart from each other with an angular interval. For example, the light-emitting display modules 101 and 102 are arranged with an angular interval of 180 degrees. Each of the light-emitting display modules 101 and 102 may include the plurality of light-emitting elements 110, for example, light-emitting diodes. The plurality of light-emitting elements 110 of each of the light-emitting display modules 101 and 102 may be arranged in one row or two or more rows in a radial direction from the rotation center 2001 of the LiDAR module 2. The plurality of light-emitting elements 110 of each of the light-emitting display modules 101 and 102 may also be arranged in a curved shape.

Figure 5:
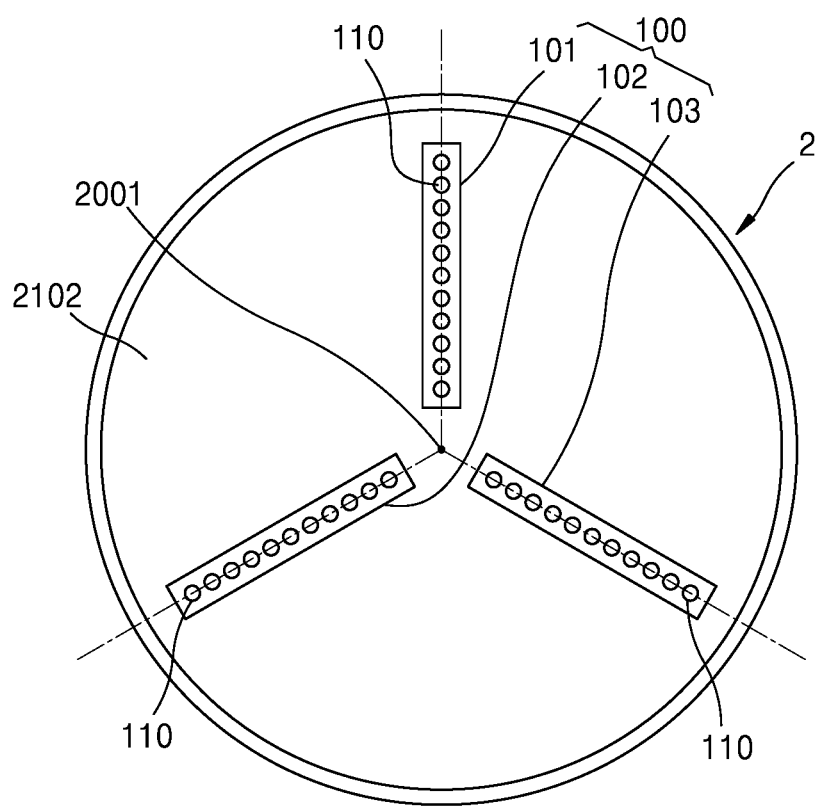
FIG. 5 is a plan view illustrating an embodiment of a light-emitting display module according to an embodiment of the disclosure.

FIG. 5 is a plan view illustrating an embodiment of the light-emitting display module 100 according to an embodiment of the disclosure.

Referring to FIG. 5, the light-emitting display module 100 may include three light-emitting display modules 101, 102, and 103. The three light-emitting display modules 101, 102, and 103 may be arranged at equal angular intervals. For example, the light-emitting display modules 101, 102, and 103 are arranged at intervals of 120 degrees. Each of the light-emitting display modules 101, 102, and 103 may include the plurality of light-emitting elements 110, for example, light-emitting diodes. The plurality of light-emitting elements 110 of each of the light-emitting display modules 101, 102, and 103 may be arranged in one row or two or more rows in a radial direction from the rotation center 2001 of the LiDAR module 2. The plurality of light-emitting elements 110 of each of the light-emitting display modules 101, 102, and 103 may also be arranged in a curved shape.

Figure 6:
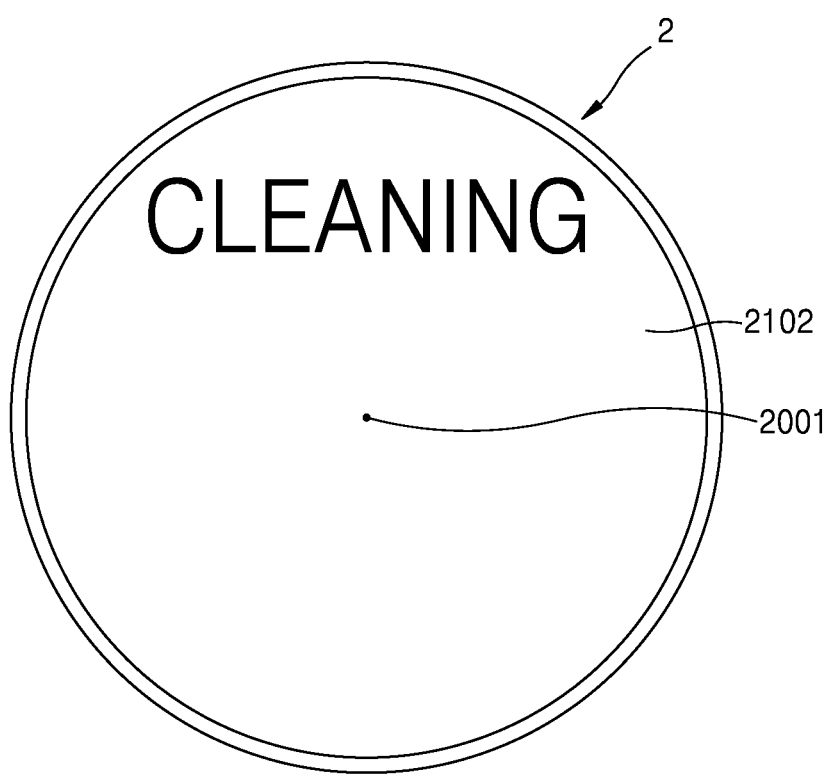
FIG. 6 illustrates an example of an image displayed by a light-emitting display module according to an embodiment of the disclosure.

FIG. 6 illustrates an example of an image displayed by the light-emitting display module 100 according to an embodiment of the disclosure.

Referring to FIG. 6, the light-emitting display module 100 is rotated together with the LiDAR module 2. By combining a rotational phase of the light-emitting display module 100 and on/off control of the plurality of light-emitting elements 110, an image may be displayed on the upper portion 2102 of the LiDAR module 2 according to an afterimage effect. Although 'cleaning' is displayed as text information in FIG. 6 as an example, the image displayed by the light-emitting display module 100 is not limited thereto. The light-emitting display module 100 may function as a display for displaying various text information such as whether the cleaning robot is operating, cleaning progress, and remaining battery power, symbol information, image information, emoticon information, animation information, and the like. Accordingly, a display 3 (FIG. 1) for a user interface, such as a liquid crystal display (LCD), may be omitted, thereby reducing the material cost of the cleaning robot and increasing the degree of freedom of arrangement of other components of the cleaning robot. In addition, according to the light-emitting display module 100 mounted on the rotating LiDAR module 2, an additional display may be provided at a relatively low cost, in addition to the existing display 3 (FIG. 1). Accordingly, diverse types of information may be provided to the user. While FIG. 6 illustrates, as an example, an image displayed on a partial area of the upper portion 2102 of the LiDAR module 2, various types of images may be displayed on the entire area of the upper portion 2102 of the LiDAR module 2.

By increasing the number of light-emitting display modules 100, the quality of a displayed image may be improved. For example, when a rotation frequency of the LiDAR module 2 is from about 5 hertz (Hz) to about 10 Hz, and when the two light-emitting display modules 101 and 102 are employed, a frequency of a displayed image is about 10 Hz to about 20 Hz, and when the three light-emitting display modules 101, 102, and 103 are employed, a frequency of a displayed image is about 15 Hz to about 30 Hz, thereby providing a high-quality image with little flicker.

The cleaning robot may include an input unit that receives a user input operation. For example, the input unit may be implemented by a button 4 provided on the body 1. The light-emitting display module 100 may display visual information corresponding to a user operation input through the button 4. The input unit may be provided in the LiDAR module 2. For example, the input unit may include a proximity sensor mounted in the LiDAR module 2 which is rotates. By using the proximity sensor, an input of user operation may be input according to, for example, whether the hand of a user is detected, a position at which the hand is detected, a duration during which detection of the hand continues, or the like. In this case, the input unit provided on the body 1, for example, the button 4, may be omitted.

Figure 7:
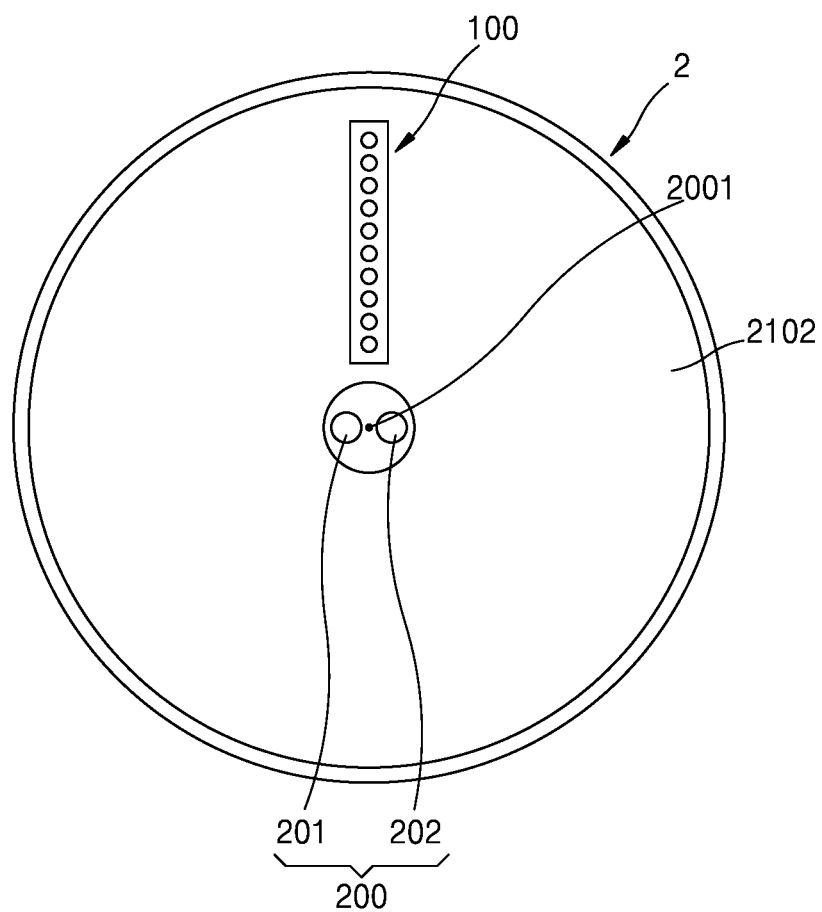
FIG. 7 is a schematic plan view of an embodiment of a cleaning robot according to an embodiment of the disclosure.

FIG. 7 is a schematic plan view of an embodiment of a cleaning robot according to an embodiment of the disclosure.

Referring to FIG. 7, an embodiment of the cleaning robot may include an upper proximity sensor 200. The upper proximity sensor 200 may be mounted in the LiDAR module 2. For example, the upper proximity sensor 200 may be arranged on the upper portion 2102 of the LiDAR module 2 to face upwards. The upper proximity sensor 200 may be a contact-type sensor or a non-contact-type sensor. As the contact-type sensor, for example, a micro-switch, an electrostatic sensor, or the like may be used. As the non-contact-type sensor, for example, an ultrasound sensor, an infrared sensor, a radio frequency (RF) sensor, or the like, may be used. By using a non-contact-type sensor as the upper proximity sensor 200, a user operation may be input without affecting the rotation of the LiDAR module 2. In addition, the non-contact-type sensor enables to make a user input without affecting the movement of a cleaning robot. The upper proximity sensor 200 may include a transmitting portion 201 transmitting a sensing signal and a receiving portion 202 receiving a signal reflected by an object. The upper proximity sensor may be a sensor detecting a distance to an object.

In the embodiment, an infrared sensor is used as the upper proximity sensor 200. Light irradiated from the transmitting portion 201 may be reflected by an object and received by the receiving portion 202. Whether there is an object, a distance to the object, or the like may be detected based on, for example, whether light is received by the receiving portion 202, a time difference between emitting of light and receiving of light, an intensity of received light, or the like. The upper proximity sensor 200 may have a sensing distance equal to or less than 50 mm, for example. Referring to FIG. 7, the upper proximity sensor 200 is arranged at the rotation center 2001 of the LiDAR module 2. In this case, even when the LiDAR module 2 is rotated, a position of the upper proximity sensor 200 is not changed. Thus, a user input operation via the upper proximity sensor 200 may be easy.

Figure 8:
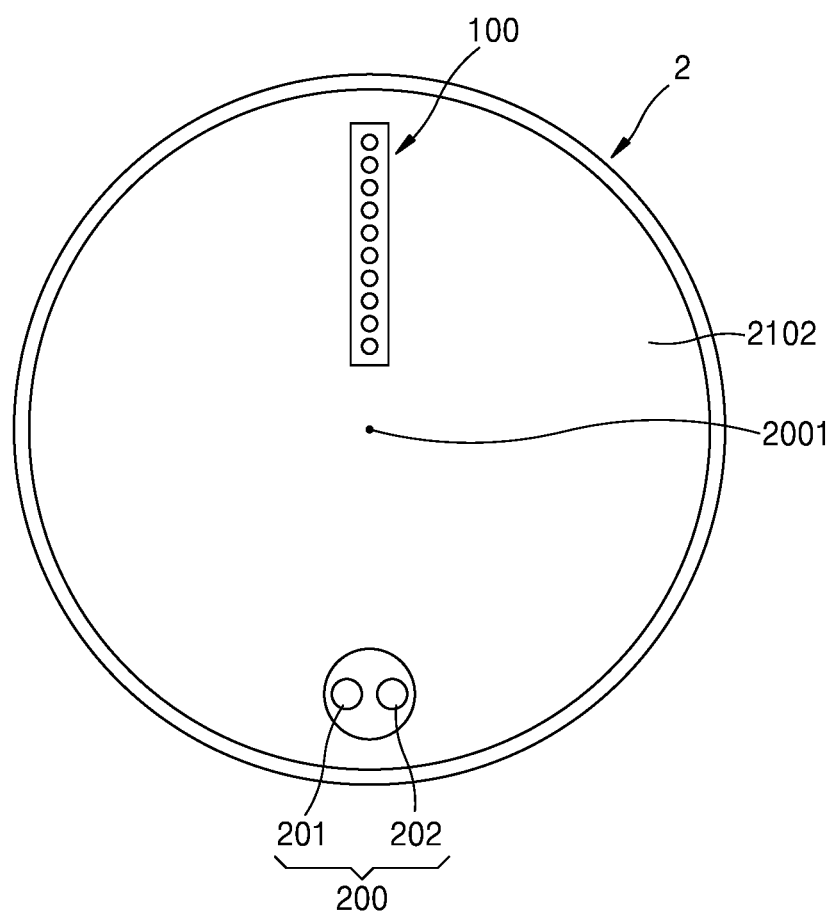
FIG. 8 is a plan view illustrating an example of arrangement of an upper proximity sensor according to an embodiment of the disclosure.

FIG. 8 is a plan view illustrating an example of arrangement of the upper proximity sensor 200 according to an embodiment of the disclosure.

Referring to FIG. 8, the upper proximity sensor 200 has an angular interval with respect to the light-emitting display module 100. For example, the upper proximity sensor 200 has an angular interval of 180 degrees with respect to the light-emitting display module 100. As the LiDAR module 2 is rotated, an angular position of the upper proximity sensor 200 is changed, and accordingly, various input operations may be performed according to angular positions at which the hand of the user is detected using the upper proximity sensor 200.

Figure 9:
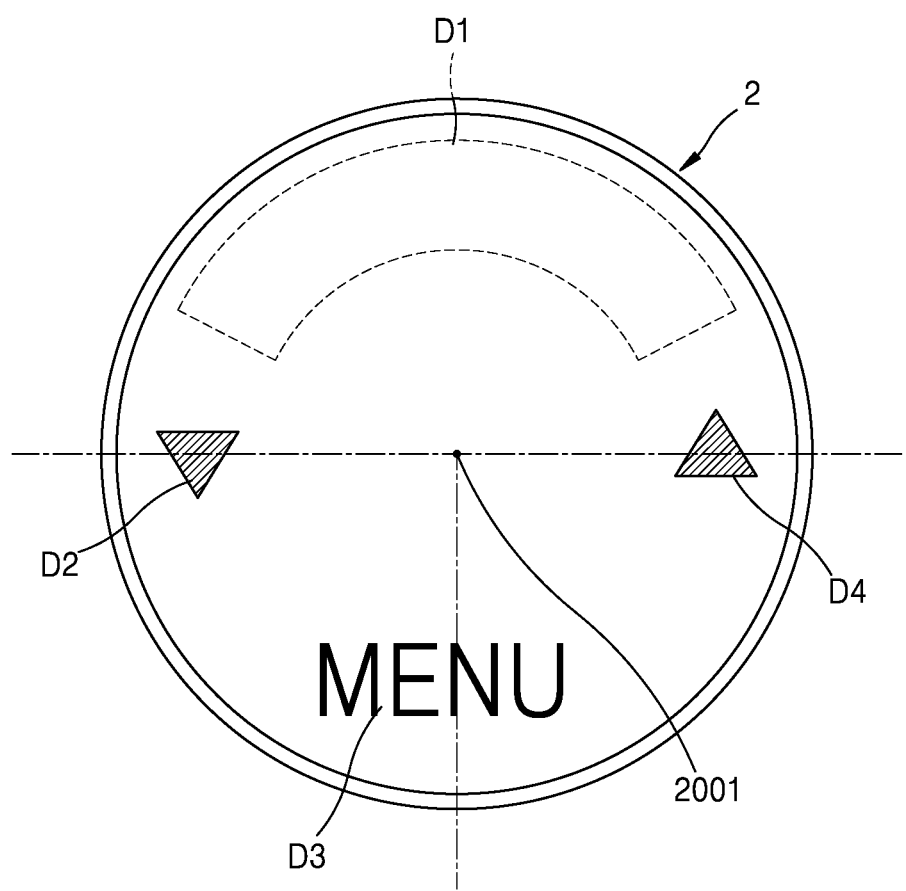
FIG. 9 illustrates an example in which a display and an input device are implemented by a combination of a light-emitting display module and an upper proximity sensor according to an embodiment of the disclosure.

FIG. 9 illustrates an example in which a display and an input unit are implemented by a combination of the light-emitting display module 100 and the upper proximity sensor 200 according to an embodiment of the disclosure.

Referring to FIG. 9, an image may be displayed on four display areas D1, D2, D3, and D4 by the light-emitting display module 100. For example, the display area D1 may be an area displaying a result of an input operation. The display area D3 may be an area for displaying a menu item. The display area D2 and the display area D4 may be areas for displaying an operation direction for changing the menu item displayed on the display area D3. For example, when a user operation, that is, the hand of the user is detected while the upper proximity sensor 200 is located on the display area D2, the light-emitting display module 100 may be controlled such that a prior menu item to a previously displayed menu item is displayed on the display area D3. Moreover, the light-emitting display module 100 may be controlled such that a result according to a selected menu item is displayed on the display area D4. For example, when a user operation, that is, the hand of the user is detected while the upper proximity sensor 200 is located on the display area D4, the light-emitting display module 100 may be controlled such that a next menu item to a previously displayed menu item is displayed on the display area D3. Moreover, the light-emitting display module 100 may be controlled such that a result according to a selected menu item is displayed on the display area D4. A detection form of the hand of the user, detected by the upper proximity sensor 200, and an input corresponding thereto may be combined in various manners. For example, combinations of various types of inputs may be made depending on cases such as when the upper proximity sensor 200 detects a hand at a certain angular position, when the upper proximity sensor 200 detects a hand at two or more angular positions, a duration during which the upper proximity sensor 200 detects a hand, or the like.

Although not illustrated in the drawings, the upper proximity sensors 200 may be arranged at the rotation center 2001 of the LiDAR module 2 and at a position at which the upper proximity sensor 200 has an angular interval with respect to the light-emitting display module 100. For example, the upper proximity sensor 200 located at the rotation center 2001 of the LiDAR module 2 may function as an input unit for selecting an upper menu, and the upper proximity sensor 200 located at a position having an angular interval with the light-emitting display module 100 may function as an input unit for selecting a sub-menu. Although not illustrated in the drawings, the upper proximity sensor 200 may also be applied to the embodiments illustrated in FIGS. 4 and 5.

FIG. 9 illustrates, as an example, the four areas D1, D2, D3, and D4 which are provided to display text information, symbol information, image information, animation information, and the like. However, various types of text information, symbol information, and image Information, emoticon information, animation information, etc. may be displayed in the entire area of the upper portion 2102 of the LiDAR module 2.

The upper proximity sensor 200 may function as an upper obstacle detecting sensor. As described above, the LiDAR module 2 protrudes from the body 1. That is, the LiDAR module 2 has a portion protruding from the upper surface 51 of the body 1. When the LiDAR module 2 collides with an obstacle thereabove, the LiDAR module 2 may be damaged. The cleaning robot may determine a structure of the indoor space according to a sensing signal of the LiDAR sensor 90 and is driven while avoiding collision with an obstacle of the LiDAR module 2 based on the structure of the indoor space. For example, a certain safe distance is set between the cleaning robot and an upper obstacle thereabove, and when a greater distance than the safe distance is secured between the cleaning robot and the upper obstacle, the cleaning robot enters under the upper obstacle. However, detection of the upper obstacle by using the LiDAR sensor 90 is limited, and in consideration of this, a relatively large safety interval may be set. In this case, the cleaning efficiency may be reduced as the cleaning robot has not entered a space which the cleaning robot could actually enter. According to the cleaning robot of the embodiment, the upper proximity sensor 200 may function as an upper obstacle detecting sensor.

Figure 10:
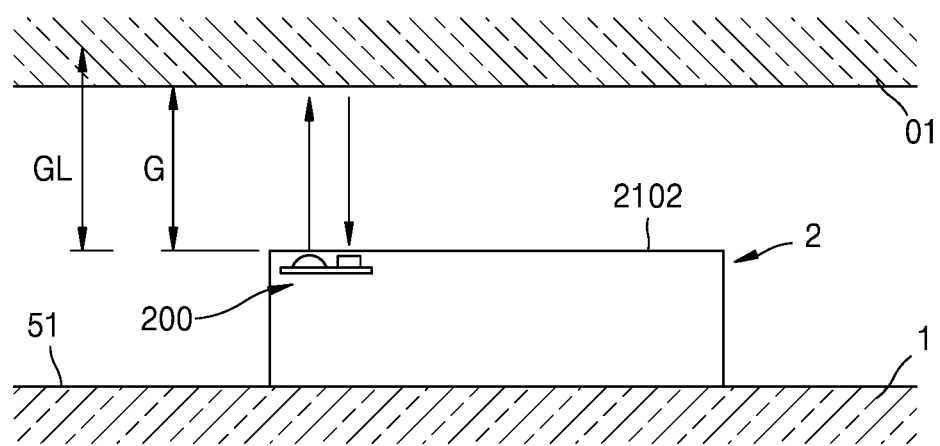
FIG. 10 illustrates an upper proximity sensor functioning as an upper obstacle detecting sensor according to an embodiment of the disclosure.

FIG. 10 illustrates the upper proximity sensor 200 functioning as an upper obstacle detecting sensor according to an embodiment of the disclosure.

Referring to FIG. 10, as the upper proximity sensor 200 is installed in the upper portion 2102 of the LiDAR module 2, a gap G between the cleaning robot and an upper obstacle O1 may be precisely measured, compared to when using the LiDAR sensor 90. That is, the gap G which is smaller than a safety gap GL set by the LiDAR sensor 90 may be measured, and it is possible to precisely determine whether the cleaning robot may enter under the upper obstacle O1. Accordingly, the possibility of collision between the cleaning robot and the upper obstacle O1 may be reduced, and cleaning may be done up to a space under the upper obstacle O1 having the gap G smaller than the safety gap GL set by the LiDAR sensor 90, thereby increasing the cleaning efficiency. In addition, accurate geometric information about the indoor space may be acquired by a combination of the upper proximity sensor 200 and the LiDAR sensor 90.

The input unit, for example, a proximity sensor, may be arranged in the side portion 2101 of the LiDAR module 2.

Figure 11:
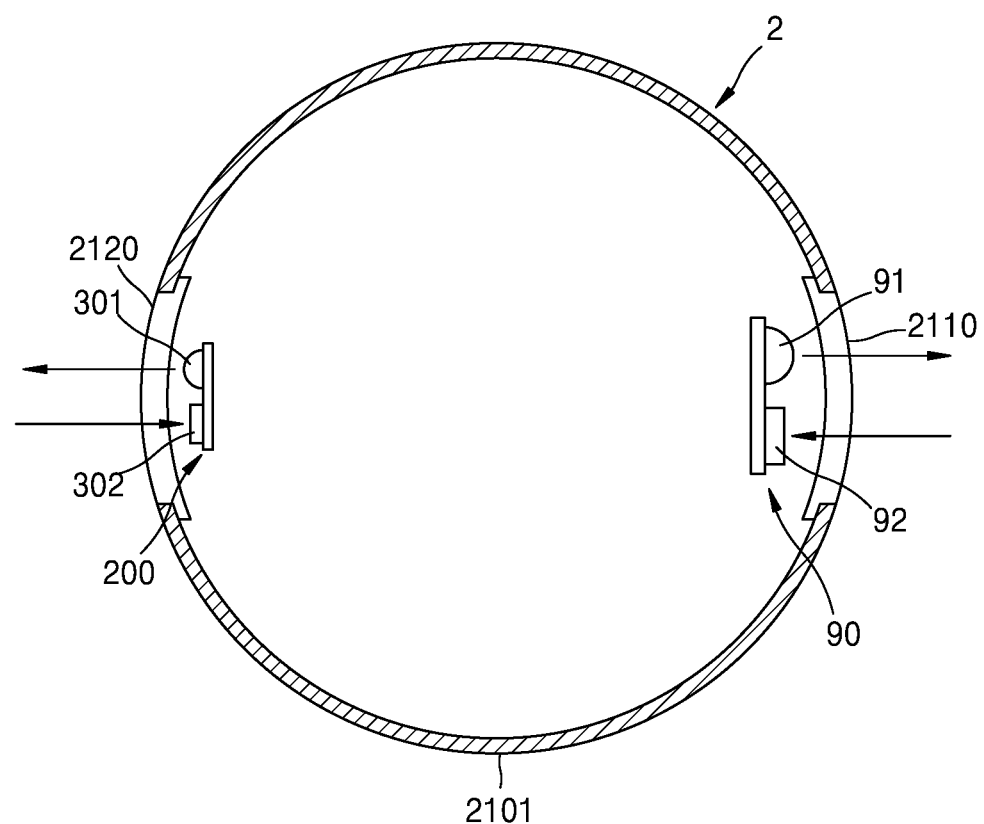
FIG. 11 illustrates an example of arrangement of a side proximity sensor according to an embodiment of the disclosure.

FIG. 11 illustrates an example of arrangement of a side proximity sensor according to an embodiment of the disclosure.

Referring to FIG. 11, a side proximity sensor 300 is arranged in the side portion 2101 of the LiDAR module 2 to face a horizontal direction. The side proximity sensor 300 may include a transmitting portion 301 transmitting a sensing signal and a receiving portion 302 receiving a signal reflected by an object. The side proximity sensor 300 may be implemented by a non-contact-type sensor such as an ultrasound sensor, an infrared sensor, or an RF sensor. By using a non-contact-type sensor as the side proximity sensor 300, a user operation may be input without affecting the rotation of the LiDAR module 2. In addition, the non-contact-type sensor enables to make a user input without affecting the movement of a cleaning robot.

In the embodiment, an infrared sensor is used as the side proximity sensor 300. Light irradiated from the transmitting portion 301 passes through a light window 2120 to be irradiated to an object, and is reflected by the object, and then passes through the light window 2120 again and is received by the receiving portion 302. Whether there is an object, a distance to the object, or the like may be detected based on whether light is received by the receiving portion 302, a time difference between emitting of light and receiving of light, an intensity of received light, or the like. The side proximity sensor 300 may have a sensing distance equal to or less than 50 mm, for example. The side proximity sensor 300 may have an angular interval with respect to the LiDAR sensor 90. For example, the angular interval of the side proximity sensor 300 with respect to the LiDAR sensor 90 may be 180 degrees. The angular interval may be less than 180 degrees as long as the angular interval is determined such that light of the side proximity sensor 300 and light of the LiDAR sensor 90 do not affect each other. In this case, the side proximity sensor 300 may be located at a position preceding the LiDAR sensor 90 with respect to a rotation direction of the LiDAR module 2.

As the LiDAR module 2 is rotated, an angular position of the side proximity sensor 300 is periodically changed. The side proximity sensor 300 may function as an input unit. For example, a function of the side proximity sensor 300 as an input unit may be performed as described with reference to FIG. 9. Various input functions may be performed according to a position at which the hand of the user is detected, a detection duration, the number of positions at which the hand of the user is detected, and the like.

As described above, the cleaning robot may determine a structure of an indoor space according to a sensing signal of the LiDAR sensor 90, and is driven while avoiding collision with an obstacle of the LiDAR module 2 based on the structure of the indoor space. It is difficult to perfectly detect obstacles having various shapes by using the LiDAR sensor 90. The side proximity sensor 300 according to the embodiment may function as an obstacle detecting sensor.

Figure 12:
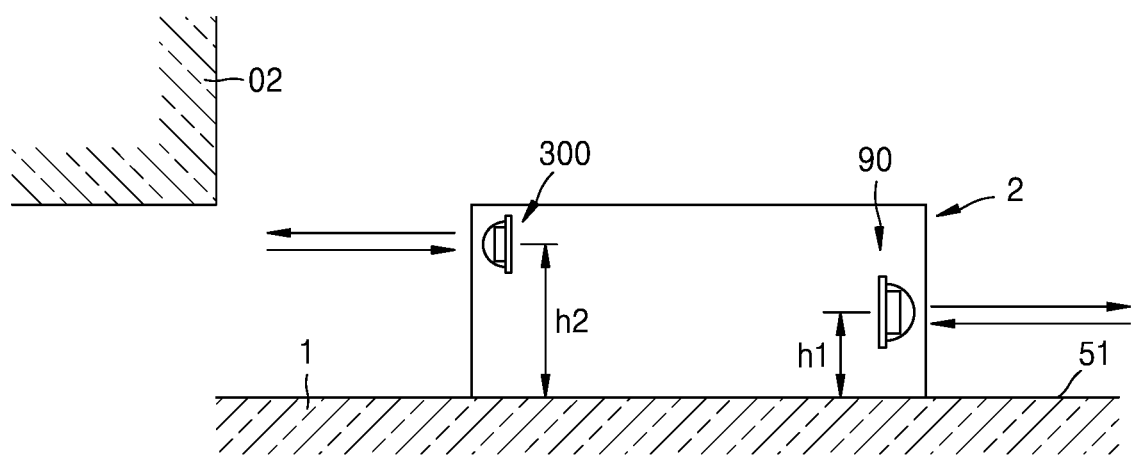
FIG. 12 illustrates a side proximity sensor functioning as an obstacle detecting sensor according to an embodiment of the disclosure.

FIG. 12 illustrates the side proximity sensor 300 functioning as an obstacle detecting sensor according to an embodiment of the disclosure.

Referring to FIG. 12, as the side proximity sensor 300 is installed in the side portion 2101 of the LiDAR module 2, it is possible to detect an obstacle O2 that has a risk of collision with the LiDAR module 2. In addition, as the side proximity sensor 300 is mounted in the rotating LiDAR module 2, it is possible to detect the obstacle O2 in a 360-degree range by using one side proximity sensor 300. Accordingly, the possibility of collision between the cleaning robot, for example, the LiDAR module 2, and the obstacle O2 may be reduced, and the limitation of a function of preventing collision due to the LiDAR sensor 90 may be addressed. In order to effectively detect the obstacle O2, the side proximity sensor 300 may be located at a position preceding the LiDAR sensor 90 with respect to the rotation direction of the LiDAR module 2. In order to effectively detect the obstacle O2 which is located thereabove, the side proximity sensor 300 may be located closer to the upper portion 2102 of the LiDAR module 2 than the LiDAR sensor 90. That is, a height h2 of the side proximity sensor 300 with respect to the upper surface 51 of the body 1 may be greater than a height h1 of the LiDAR sensor 90.

In the embodiments described above, a combination of the light-emitting display module 100 and the upper proximity sensor 200 and a combination of the light-emitting display module 100 and the side proximity sensor 300 have been described. However, a combination of the light-emitting display module 100, the upper proximity sensor 200, and the side proximity sensor 300 is also possible.

Figure 13:
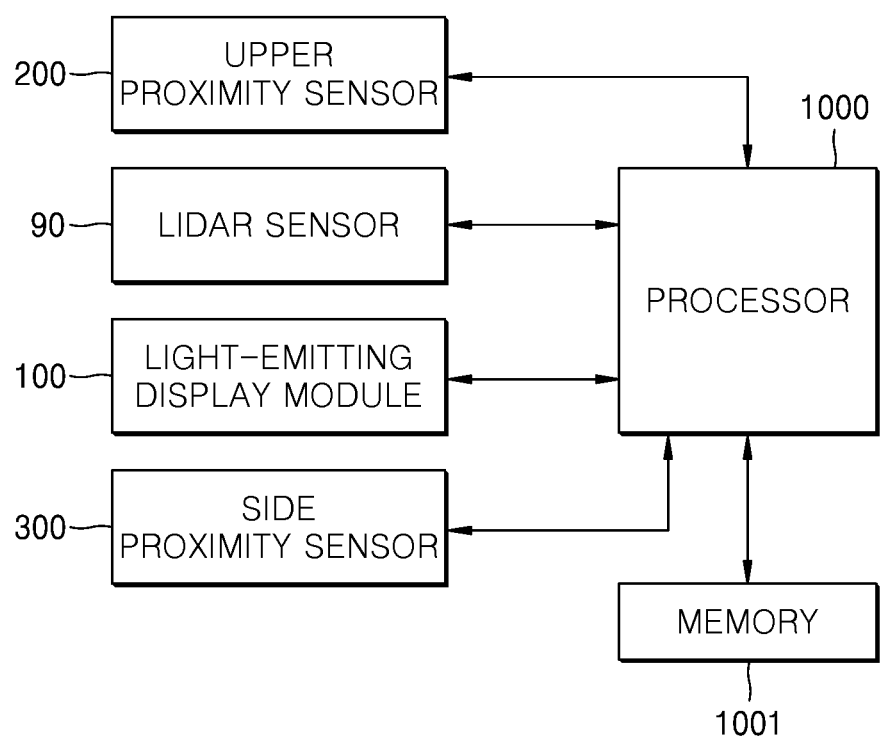
FIG. 13 is a schematic structural diagram of an embodiment of a cleaning robot according to an embodiment of the disclosure.

FIG. 13 is a schematic structural diagram of an embodiment of a cleaning robot according to an embodiment of the disclosure.

Referring to FIG. 13, the cleaning robot may include a processor 1000 and a memory 1001. Although not illustrated in the drawing, the cleaning robot may further include a power module. The power module may include a battery, a power driving circuit, a converter, and a transformation circuit. The LiDAR sensor 90 is a sensor that outputs laser and obtains geometric information including at least one of a distance, a position, a direction, or a material of an object from which the output laser is reflected. The LiDAR sensor 90 is mounted in the rotating LiDAR module 2 as described above. The LiDAR sensor 90 may obtain geometric information about a region with respect to a current position, for example, an area within a radius of 6 m or less. The LiDAR sensor 90 may provide the obtained geometric information to the processor 1000.

The processor 1000 may execute one or more instructions of a program stored in a memory 1001. The processor 1000 may include hardware components that perform arithmetic, logic, input/output operations and signal processing. The processor 1000 may include, for example, at least one of a central processing unit, a microprocessor, a graphics processing unit, application specific integrated circuits (ASICs), digital signal processors (DSPs), digital signal processors (DSPDs), programmable logic devices (PLDs), and field programmable gate arrays (FPGAs), but is not limited thereto. While the processor 1000 is illustrated as one element in FIG. 13, the disclosure is not limited thereto. In an embodiment, the processor 1000 may be configured as one or a plurality of elements. In an embodiment, the processor 1000 may include an artificial intelligence (AI) processor that performs AI learning. In this case, the AI processor may recognize a type of object or obstacle existing in an indoor space by using a learning network model of an AI system. The AI processor may be manufactured in a form of a dedicated hardware chip for AI, or may be manufactured as a part of an existing general-purpose processor (e.g., CPU or application processor) or graphics-only processor (e.g., graphics processing unit (GPU)) and mounted in the cleaning robot.

The memory 1001 may store instructions for generating a map of an indoor space. In an embodiment, instructions and program codes readable by the processor 1000 may be stored in the memory 1001. The memory 1001 may be configured as at least one type of storage medium from among, for example, a flash memory type, a hard disk type, a multimedia card micro type, a card type memory (e.g., secure digital (SD) or eXtreme digital (XD) memory, etc.), random access memory (RAM), static random access memory (SRAM), read-only memory (ROM), electrically erasable programmable read-only memory (EEPROM), programmable read-only memory (PROM), or an optical disk. In an embodiment, the cleaning robot may operate a web storage or a cloud server that is accessible through a network and performs a storage function. The processor 1000 executes instructions or program codes stored in the memory 1001.

The processor 1000 may search, by using the LiDAR sensor 90, an indoor space based on a first position where the cleaning robot is currently located. The processor 1000 may obtain geometric information regarding a distance, a position, and a direction of an empty space, a wall, an object, or an obstacle, detected in the indoor space, from the LiDAR sensor 90. In an embodiment, the processor 1000 may obtain, from the upper proximity sensor 200 and/or the side proximity sensor 300, information about obstacles existing in the indoor space, for example, protrusions, furniture, home appliances, or companion animals. The processor 1000 may obtain a map of the indoor space by using sensing information obtained using the LiDAR sensor 90 and the upper proximity sensor 200 and/or the side proximity sensor 300. The processor 1000 may identify a position of the cleaning robot on the map by using Simultaneous Localization and Mapping (SLAM) technology, set a movement target of the cleaning robot, and control the cleaning robot to perform cleaning.

The processor 1000 may rotate the LiDAR module 2 and control on/off of the plurality of light-emitting elements 110 of the light-emitting display module 100 to display an image on the upper portion 2102 of the LiDAR module 2 by using an afterimage effect. The processor 1000 may control the cleaning robot to perform various functions by using, as input elements, a position, at which the hand of the user is detected by the upper proximity sensor 200, and a detection duration. The processor 1000 may control the light-emitting display module 100 to display a corresponding image by using, as input elements, the position, at which the user's hand is detected by the upper proximity sensor 200, and the detection duration. The processor 1000 may control the cleaning robot to perform various functions by using, as input elements, a position, at which the user's hand is detected by the side proximity sensor 300, and the detection duration. The processor 1000 may control the light-emitting display module 100 to display a corresponding image by using, as input elements, the position, at which the user's hand is detected by the side proximity sensor 300, and the detection duration. The processor 1000 may obtain a map of the indoor space by using information about the obstacle O1 detected by the upper proximity sensor 200, and control the cleaning robot such that the cleaning robot does not collide with the obstacle O1. The processor 1000 may obtain a map of the indoor space by using information about the obstacle O2 detected by the side proximity sensor 300, and control the cleaning robot such that the cleaning robot does not collide with the obstacle O2.

Figure 14:
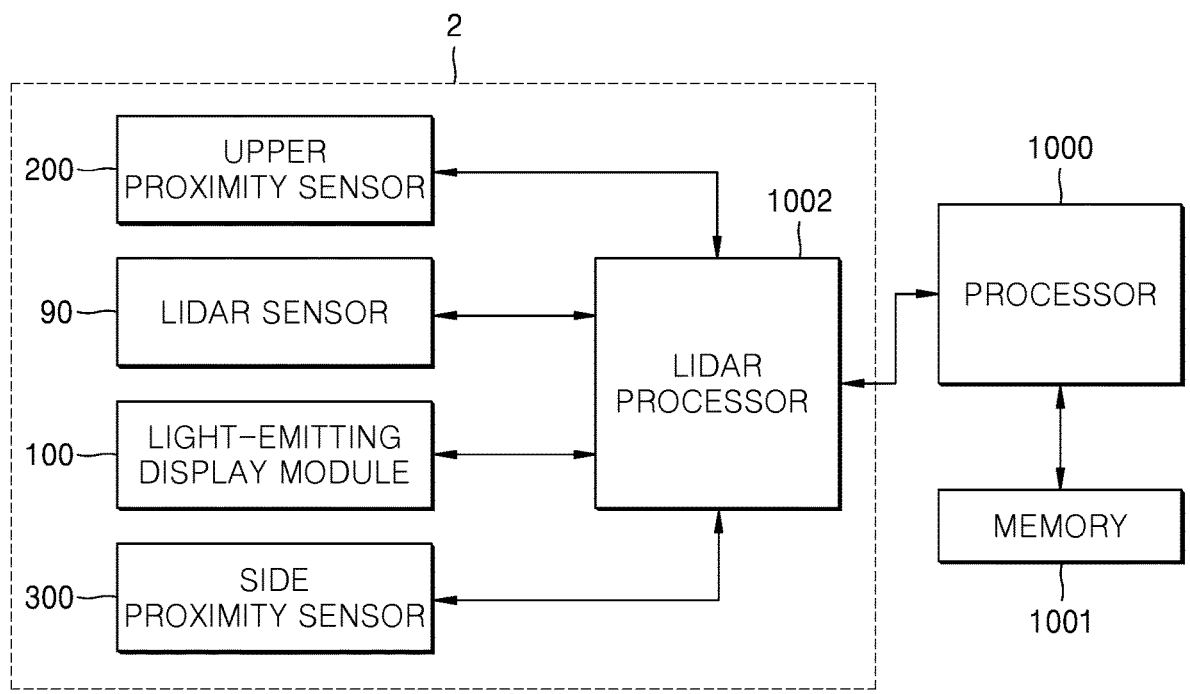
FIG. 14 is a schematic structural diagram of an embodiment of a cleaning robot according to an embodiment of the disclosure.

FIG. 14 is a schematic structural diagram of an embodiment of a cleaning robot according to an embodiment of the disclosure.

The embodiment of the cleaning robot illustrated in FIG. 14 is different from the cleaning robot illustrated in FIG. 13 in that a LiDAR processor 1002 is embedded in the LiDAR module 2. Hereinafter, the differences will be described.

Referring to FIG. 14, the LiDAR module 2 may include the LiDAR processor 1002. The LiDAR processor 1002 may be a processor embedded with a memory (not shown). While not illustrated in the drawing, the LiDAR module 2 may further include a memory (external memory). The LiDAR processor 1002 may execute one or more instructions of a program stored in an internal memory or an external memory. The LiDAR processor 1002 may include hardware components that perform arithmetic, logic, input/output operations and signal processing. The LiDAR processor 1002 may include, for example, at least one of a central processing unit, a microprocessor, a graphics processing unit, application specific integrated circuits (ASICs), digital signal processors (DSPs), digital signal processors (DSPDs), programmable logic devices (PLDs), and field programmable gate arrays (FPGAs), but is not limited thereto. Although the LiDAR processor 1002 is illustrated as one element in FIG. 14, the disclosure is not limited thereto. In an embodiment, the LiDAR processor 1002 may be configured as one or a plurality of elements.

By using the LiDAR sensor 90, the LiDAR processor 1002 may search an indoor space based on a first position where the cleaning robot is currently located and obtain geometric information regarding a distance, a position, and a direction of an empty space, a wall, an object, or an obstacle, detected in the indoor space. In an embodiment, the LiDAR processor 1002 may obtain, from the upper proximity sensor 200 and/or the side proximity sensor 300, information about obstacles existing in the indoor space, for example, protrusions, furniture, home appliances, or companion animals. The LiDAR processor 1002 may transmit sensing information obtained using the LiDAR sensor 90 and the upper proximity sensor 200 and/or the side proximity sensor 300, to the processor 1000, and the processor 1000 may obtain a map of the indoor space by using the transmitted sensing information. The processor 1000 may identify a position of the cleaning robot on the map by using Simultaneous Localization and Mapping (SLAM) technology, set a movement target of the cleaning robot, and control the cleaning robot to perform cleaning.

The LiDAR processor 1002 may rotate the LiDAR module 2 and control on/off of the plurality of light-emitting elements 110 of the light-emitting display module 100 based on the information transmitted from the processor 1000, and display an image on the upper portion 2102 of the LiDAR module 2 by using an after image effect. The LiDAR processor 1002 may transmit, to the processor 1000, input elements such as a position, at which the hand of the user is detected by the upper proximity sensor 200, and a detection duration thereof, and the processor 1000 may control the cleaning robot to perform various functions, based on the transmitted input elements. The LiDAR processor 1002 may transmit, to the processor 1000, input elements such as a position, at which the hand of the user is detected by the upper proximity sensor 200, and a detection duration thereof, and the processor 1000 may control, based on the transmitted input elements, the light-emitting display module 100 directly or via the LiDAR processor 1002 to display a corresponding image. The LiDAR processor 1002 may transmit, to the processor 1000, input elements such as a position, at which the hand of the user is detected by the side proximity sensor 300, and a detection duration thereof, and the processor 1000 may control the cleaning robot to perform various functions, based on the transmitted input elements. The LiDAR processor 1002 may transmit, to the processor 1000, input elements such as a position, at which the hand of the user is detected by the side proximity sensor 300, and a detection duration thereof, and the processor 1000 may control, based on the transmitted input elements, the light-emitting display module 100 directly or via the LiDAR processor 1002 to display a corresponding image. The LiDAR processor 1002 may transmit information about the obstacle O1 detected by the upper proximity sensor 200, to the processor 1000, and the processor 1000 may obtain a map of the indoor space by using the transmitted information about the obstacle O1, and control the cleaning robot such that the cleaning robot does not collide with the obstacle O1. The LiDAR processor 1002 may transmit information about the obstacle O2 detected by the side proximity sensor 300, to the processor 1000, and the processor 1000 may obtain a map of the indoor space by using the transmitted information about the obstacle O2, and control the cleaning robot such that the cleaning robot does not collide with the obstacle O2.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A cleaning robot comprising:
   a body;
   a light detection and ranging (LiDAR) module having a LiDAR sensor and rotatably supported by the body; and
   a light-emitting display module mounted on the LiDAR module,
   wherein the light-emitting display module is configured to display an image based on an afterimage effect according to a rotation of the LiDAR module,
   wherein the light-emitting display module is mounted in an upper horizontal surface of the LiDAR module.

2. The cleaning robot of claim 1, further comprising:
   a plurality of light-emitting display modules.

3. The cleaning robot of claim 2, wherein the plurality of light-emitting display modules are arranged at equal angular intervals.

4. The cleaning robot of claim 1, wherein the LiDAR module includes an input unit for receiving an input.

5. The cleaning robot of claim 4, wherein the input unit comprises a non-contact-type sensor.

6. The cleaning robot of claim 4, wherein the input unit comprises a proximity sensor.

7. The cleaning robot of claim 4, wherein the input unit comprises an upper proximity sensor arranged in an upper portion of the LiDAR module.

8. The cleaning robot of claim 7, wherein the upper proximity sensor is arranged at a rotational center of the LiDAR module.

9. The cleaning robot of claim 7, wherein the upper proximity sensor has an angular interval with respect to the light-emitting display module.

10. The cleaning robot of claim 4, wherein the input unit comprises a side proximity sensor arranged in a side portion of the LiDAR module.

11. The cleaning robot of claim 10, wherein the side proximity sensor has an angular interval with respect to the LiDAR sensor.

12. The cleaning robot of claim 10, wherein the side proximity sensor is arranged closer to an upper portion of the LiDAR module than the LiDAR sensor.

13. A cleaning robot comprising:
a body;
a light detection and ranging (LiDAR) module having a LiDAR sensor and rotatably supported by the body;
a proximity sensor mounted in the LiDAR module; and
a light-emitting display module mounted on an upper horizontal surface of the LiDAR module.

14. The cleaning robot of claim 13, wherein the proximity sensor comprises an upper proximity sensor arranged in an upper portion of the LiDAR module.

15. The cleaning robot of claim 13, wherein the proximity sensor comprises a side proximity sensor arranged in a side portion of the LiDAR module.

16. The cleaning robot of claim 13,
wherein the light-emitting display module is configured to display an image based on an afterimage effect according to a rotation of the LiDAR module.

17. The cleaning robot of claim 16, wherein the light-emitting display module includes a plurality of light-emitting elements.

18. The cleaning robot of claim 17, wherein the plurality of light-emitting elements each includes a light-emitting diode.

19. The cleaning robot of claim 17, wherein the plurality of light-emitting elements are arranged in a radial direction from a rotation center of the LiDAR module.

* * * * *